(12) United States Patent
Werner et al.

(10) Patent No.: US 9,042,432 B2
(45) Date of Patent: May 26, 2015

(54) ADAPTIVE FILTER BANK FOR DYNAMIC NOTCHING IN POWERLINE COMMUNICATION

(71) Applicant: QUALCOMM Incorporated, San Diego, CA (US)

(72) Inventors: Marc Walter Werner, Heroldsberg (DE); Stefan Brueck, Neunkirchen am Brand (DE); Lawrence Winston Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 13/828,996

(22) Filed: Mar. 14, 2013

(65) Prior Publication Data

US 2014/0269868 A1 Sep. 18, 2014

(51) Int. Cl.
*H04B 1/38* (2006.01)
*H04B 15/00* (2006.01)
*H04B 3/54* (2006.01)
*H04L 1/20* (2006.01)
*H04L 25/06* (2006.01)

(52) U.S. Cl.
CPC ............ *H04B 15/00* (2013.01); *H04B 3/542* (2013.01); *H04L 1/20* (2013.01); *H04L 25/067* (2013.01); *H04B 3/54* (2013.01); *H04B 2203/5416* (2013.01); *H04B 2203/5495* (2013.01)

(58) Field of Classification Search
CPC ......... H04L 1/20; H04L 25/067; H04M 11/06
See application file for complete search history.

(56) References Cited

U.S. PATENT DOCUMENTS

| 8,155,176 | B2 | 4/2012 | Propp et al. |
| 2009/0307540 | A1 | 12/2009 | Razazian et al. |
| 2010/0195744 | A1 | 8/2010 | Schwager et al. |
| 2011/0051956 | A1* | 3/2011 | Jeong et al. .................. 381/94.1 |

(Continued)

FOREIGN PATENT DOCUMENTS

| EP | 1499033 | 3/2007 |
| WO | 2006135081 | 12/2006 |
| WO | 2014153074 | 9/2014 |

OTHER PUBLICATIONS

PCT Application No. PCT/US2014/028948 International Search Report and Written Opinion, Jun. 23, 2014, 9 pages.

(Continued)

*Primary Examiner* — Leon-Viet Nguyen
(74) *Attorney, Agent, or Firm* — DeLizio Law, PLLC

(57) ABSTRACT

An adaptive filter bank can be implemented on a PLC device to dynamically adapt to variations in notching requirements and the performance of the PLC medium. The PLC device can apply filter coefficients to one or more filter elements of the adaptive filter bank to generate one or more notched subcarriers in the PLC band. A performance measurement of one or more subcarriers in the PLC band can be determined and evaluated against corresponding performance measurement thresholds. For a given notched subcarrier, if the performance measurement of the corresponding subcarriers is not in accordance with the performance measurement threshold, updated filter coefficients for the filter element configured to generate the notched subcarrier can be determined based, at least in part, on the performance measurement of the one or more subcarriers. The filter coefficients of the filter element can then be updated using the updated filter coefficients.

41 Claims, 6 Drawing Sheets

(56) References Cited

U.S. PATENT DOCUMENTS

| | | |
|---|---|---|
| 2012/0030269 A1 | 2/2012 | Rubio et al. |
| 2012/0087404 A1* | 4/2012 | Horvat et al. ................. 375/229 |
| 2012/0147938 A1 | 6/2012 | Schwager et al. |
| 2012/0320869 A1* | 12/2012 | Stadelmeier et al. ......... 370/329 |
| 2012/0320958 A1* | 12/2012 | Schwager et al. ............ 375/222 |
| 2013/0051498 A1* | 2/2013 | Taft ................................ 375/340 |

OTHER PUBLICATIONS

"PCT Application No. PCT/US2014/028948 International Preliminary Report on Patentability", Feb. 16, 2015, 6 pages.

* cited by examiner

ADAPTIVE FILTER BANK FOR DYNAMIC NOTCHING IN POWERLINE COMMUNICATION

BACKGROUND

Embodiments of the inventive subject matter generally relate to the field of communication networks and, more particularly, to an adaptive filter bank for dynamic notching in a powerline communication network.

Electric transmission and distribution lines are typically used for providing electric power from generators to buildings, residences, and other components of a city's infrastructure. Electric power is transmitted over the transmission lines at a high voltage, and distributed to buildings and other structures at much lower voltages using electric power lines. Besides providing electric power, electric power lines can also be used to implement powerline communications within buildings and other structures. Powerline communications provides a means for networking electronic devices together and also connecting the electronic devices to the Internet. For example, HomePlug® devices can be used for wired broadband networking using IEEE P1901 standards for broadband over powerline communication. However, the powerline communication networks can be subject to interference, which can corrupt data packets exchanged via the powerline communication network.

SUMMARY

Various embodiments for implementing an adaptive filter bank for efficient notching in a powerline communication network are disclosed. In one embodiment, a communication device generates one or more notched frequency subcarriers in a communication band by applying filter coefficients associated with at least a subset of a plurality of filter elements of a filter bank. In the communication device, each of the plurality of filter elements is configured to generate at least one notched subcarrier in the communication band. A performance measurement of one or more subcarriers in the communication band is determined. Updated filter coefficients associated with at least a first filter element of the subset of the plurality of filter elements are determined based, at least in part, on the performance measurement of the one or more subcarriers. Operating characteristics of at least one notched subcarrier of the communication band are varied based, at least in part, on the filter coefficients associated with the first filter element.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
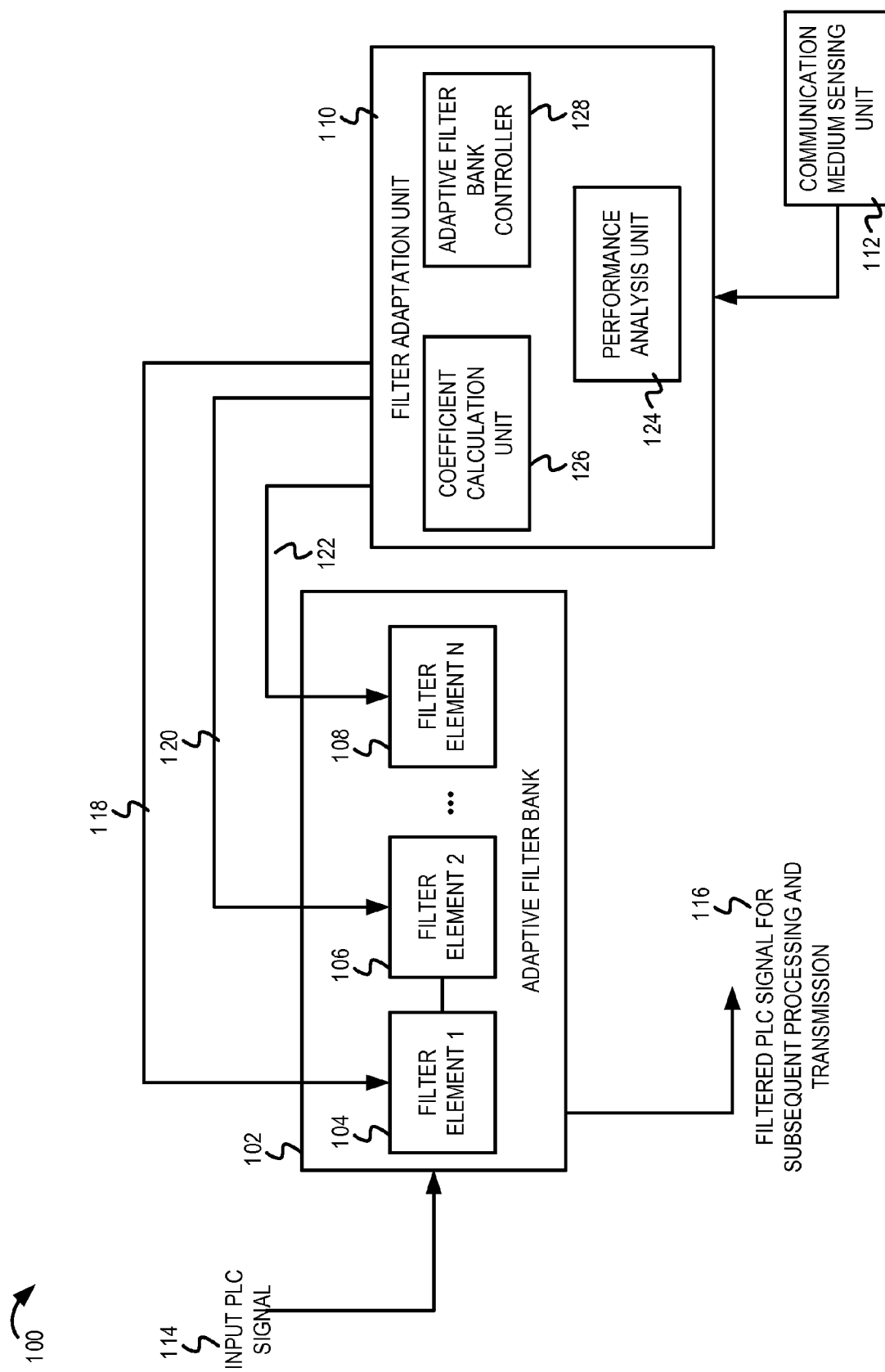
FIG. 1 is an example block diagram including an adaptive filter bank mechanism for notching in a powerline communication (PLC) device.

The description that follows includes exemplary systems, methods, techniques, instruction sequences, and computer program products that embody techniques of the present inventive subject matter. However, it is understood that the described embodiments may be practiced without these specific details. For instance, although some embodiments refer to a HomePlug AV device implementing an adaptive filter bank for dynamic notching, embodiments are not so limited. In other embodiments, network devices that implement other suitable powerline communication technologies (e.g., G.HN powerline devices) and other communication technologies (e.g., Ethernet, wireless local area network (WLAN)) can implement the adaptive filtering techniques described herein. In other instances, well-known instruction instances, protocols, structures, and techniques have not been shown in detail in order not to obfuscate the description.

A powerline communication (PLC) device typically operates in accordance with the "HomePlug AV" standard and, depending on the version of the standard, uses a wide frequency band (e.g., from 1.8 MHz to 30 MHz, or up to 86 MHz) for PLC signal transmission (e.g., using orthogonal frequency division multiplexing (OFDM) techniques). However, the PLC signal can interfere with other communication devices and applications (e.g., radio frequency identification (RFID) applications) operating in the same frequency range as the PLC device. To avoid interference from PLC signal transmission in overlapping communication bands used by the other communication applications, certain subcarriers (or groups of contiguous subcarriers) of the PLC band can be excluded (or notched) from the PLC signal to be transmitted. Currently, the subcarriers of the PLC signal that are excluded during transmission may be predetermined based on PLC standards (e.g., HomePlug AV standards). These predetermined subcarriers on which the PLC device is not permitted to communicate (in accordance with PLC standards) are herein referred to as "static notched subcarriers." For example, for PLC signal transmission, current HomePlug AV 1.1 devices are typically required to reduce the power spectral density by at least 30 dB in ten subcarriers ("notched subcarriers" or "notches") of the PLC band. Because of the frequency characteristics of the notched subcarriers, additional guard bands are typically employed on either edge of the notched subcarriers to meet notching requirements. Accordingly, one or more subcarriers that are adjacent to the notched subcarriers ("adjacent subcarriers") may not be available for transmission (e.g., because of the guard bands), thus reducing the number of subcarriers (e.g., frequency resources) available for transmission and reducing the overall throughput of the PLC device. Furthermore, for a PLC signal that is scheduled to be transmitted, it may be difficult to shape the transmitted OFDM symbols in the frequency and the time domains, while simultaneously maintaining guard bands (in the frequency domain) and guard intervals (in the time domain), minimizing inter-symbol interference (ISI), and fulfilling the notching requirements. For example, efficient notching in the frequency domain can cause ISI in the time domain. However, employing guard intervals to reduce time-domain ISI can reduce the amount of available time-domain resources available for transmission. Existing PLC devices typically employ a time domain windowing function with overlap, where each OFDM symbol of the PLC signal is multiplied with the windowing function optimized for the requisite notches. However, this is a static solution and can result in capacity loss and performance degradation as the notching requirements change (e.g., as the number and depth of notches increases). Furthermore, it is typically not sufficient to simply configure the PLC device to not transmit in the static notched subcarriers. This is because transmission of the PLC signal can also result in out-of-band emissions from adjacent subcarriers that may interfere with the other communication applications.

In some embodiments, the PLC device can implement an adaptive filter bank (e.g., in a PLC transmitter unit). Instead of statically modifying the PLC signal, the adaptive filter bank can be configured to dynamically adapt the PLC signal to the changes in current notching requirements (e.g., number, position, and width of notches in the PLC band, which notches should currently be enabled/disabled, etc.), performance measurements in subcarriers that are adjacent to the notched subcarriers ("adjacent subcarriers"), current power spectral density requirements in the adjacent subcarriers and the notched subcarriers, etc., as will be further described below with reference to FIGS. 1-6. In one implementation, after identifying the static notched subcarriers, performance measurements associated with the remaining subcarriers can be monitored. A subset of filter elements (in the adaptive filter bank) that correspond to subcarriers with performance measurements that are not in accordance with performance thresholds can be activated to generate "dynamic notched subcarriers." The PLC device can be configured to adapt the filter coefficients of each of the filter elements in the adaptive filter bank if the operating conditions in the adjacent subcarriers deviate from current operating conditions and/or if the overall performance of the PLC device in the PLC band is not in accordance with corresponding performance thresholds. The filter coefficients of the filter elements can also be dynamically updated to optimize the width of the guard bands (in the adjacent subcarriers) against the performance of the adjacent subcarriers. Such a dynamic subcarrier notching technique can improve the performance (e.g., throughput) of the PLC device when compared to the static windowing approach. The dynamic technique for subcarrier notching can also meet the notching requirements encountered by PLC devices in different environments and minimize system capacity losses and performance degradation due to improper or insufficient notching.

FIG. 1 is an example block diagram including an adaptive filter bank mechanism for notching in a powerline communication (PLC) device 100. In some embodiments, the PLC device 100 can be a legacy network device that comprises one network interface and that only executes functionality for exchanging communications over a powerline network. In other embodiments, the PLC device 100 can be part of a hybrid network device where at least one network interface of the hybrid network device implements the powerline communication functionality while other network interfaces implement other suitable wired or wireless communication protocols (e.g., Ethernet communication protocols, wireless local area network (WLAN) communication protocols, such as IEEE 802.11 communication protocols, etc.). In some embodiments, the PLC device 100 can be a HomePlug AV device. FIG. 1 depicts a PLC device 100 as an example network device. However, in other embodiments, the PLC device 100 may be any type of network device, such as network devices that implement other suitable types of communication technologies (e.g., Ethernet, WLAN, etc.). Referring back to the example of FIG. 1, the PLC device 100 comprises an adaptive filter bank 102, a filter adaptation unit 110, and a communication medium sensing unit 112. The adaptive filter bank 102 comprises N filter elements 104, 106 . . . 108. In FIG. 1, the communication medium sensing unit 112 is coupled with the filter adaptation unit 110 which, in turn, is coupled with the adaptive filter bank 102. The filter adaptation unit 110 comprises a performance analysis unit 124, a coefficient determination unit 126, and an adaptive filter band controller 128. Specifically, in one embodiment, the filter adaptation unit 110 (e.g., the performance analysis unit 124) can receive performance measurements associated with one or more subcarriers from the communication medium sensing unit 112 and can analyze the received performance measurements to determine whether to notch one or more subcarriers of a PLC band. The coefficient determination unit 126 can determine filter coefficients of one or more filter elements based, at least in part, on the received performance measurements. The adaptive filter band controller 128 can provide signals via control lines 118, 120 . . . 122 to control/update the filter coefficients (and accordingly the filter characteristics) of the filter elements 104, 106 . . . 108 respectively. The adaptive filter bank 102 receives an input PLC signal 114 and generates an output filtered PLC signal 116 for subsequent processing and transmission. It is noted that in some embodiments, the adaptive filter bank 102 may receive the input PLC signal 114 after suitable pre-processing operations (e.g., pre-amplification, etc.). Furthermore, the output PLC signal can be further processed (e.g., post-amplification, modulation, digital-to-analog conversion, etc.) before being transmitted on the powerline network. As will be further described below, the adaptive filter bank 102, the filter adaptation unit 110, and the communication medium sensing unit 112 can operate in conjunction to adapt to the varying conditions/performance detected by the PLC device 100 for efficient notching in the PLC band.

In some implementations, the filter adaptation unit 110 (e.g., the adaptive filter band controller 128) activates those filter elements of the adaptive filter bank 102 that are configured to generate static notched subcarriers in the PLC band. Typically, each filter element 104, 106 . . . 108 in the adaptive filter bank 102 is responsible for notching one subcarrier (or one group of subcarriers) in the PLC band. In other words, if PLC device 100 is configured to generate 15 notches, the filter bank 102 can comprise at least 15 filter elements—one filter element to generate corresponding ones of the 15 notches. For example, the filter adaptation unit 110 (e.g., the adaptive filter band controller 128) may determine that the filter element 104 is configured to generate a static notched subcarrier (or a notched group of contiguous subcarriers) in the PLC band and may enable/activate the filter element 104. As another example, the filter adaptation unit 110 (e.g., the adaptive filter band controller 128) may determine that the filter elements 106 and 108 are configured to generate dynamic notches in the PLC band and may initially disable the filter elements 106 and 108. In some embodiments, the filter adaptation unit 110 (e.g., the adaptive filter band controller 128) can transmit suitable signals along the control lines 118, 120, and 122 to either activate or disable the corresponding filter elements 104, 106, and 108. The filter adaptation unit 110 (e.g., the coefficient determination unit 126) can transmit an indication of the filter coefficients that should be applied to the filter elements 104, 106, and 108 so that the filter elements 104, 106, and 108 notch the appropriate subcarriers of the PLC band with a suitable notching depth/width. In some embodiments, the filter adaptation unit 110 may apply two control signals along the control lines 118, 120, and 122— a first control signal to either enable or disable the corresponding filter element 104, 106, and 108, and a second control signal to apply the appropriate filter coefficients to the enabled filter elements. In other embodiments, the filter adaptation unit 110 may only provide one control signal to apply the appropriate filter coefficients. In this embodiment, the filter adaptation unit 110 can provide non-zero filter coefficients to a filter element (e.g., the filter element 104) to indirectly indicate that the filter element 104 should be enabled/activated. Providing zero-value filter coefficients to a filter element (e.g., the filter element 106) can indicate that the filter element 106 should currently be disabled. In some embodiments, the initial filter coefficients of the enabled filter elements 104 can be applied based on the best channel performance. As will be further described below, the filter coefficients can be subsequently adapted based on the variations in signal-to-noise ratio (SNR) and/or other suitable performance measurements in the adjacent subcarriers.

Figure 2:
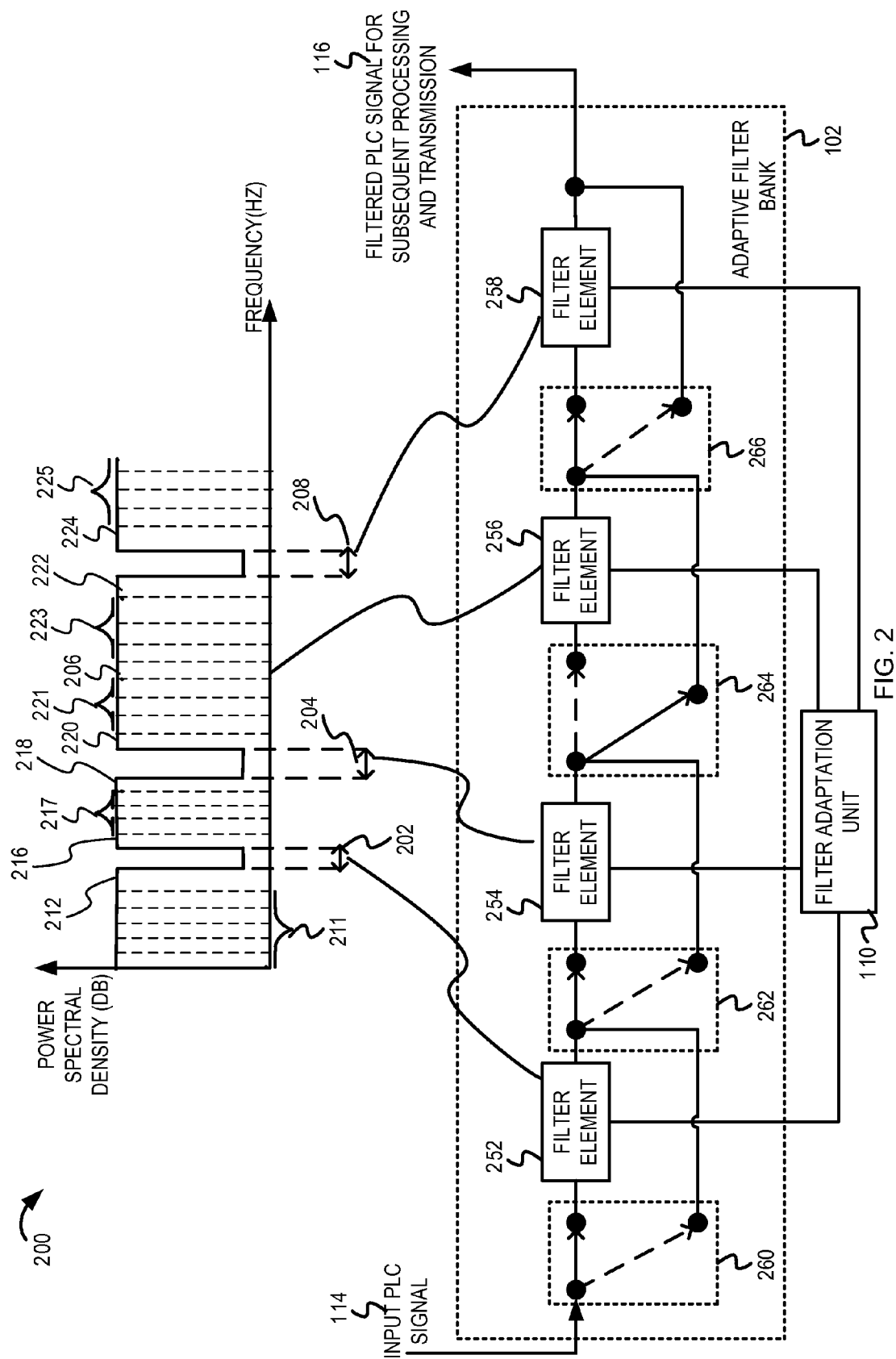
FIG. 2 is an example embodiment of a filter bank where each filter element generates a notched subcarrier.

FIG. 2 is an example embodiment of an adaptive filter bank where each filter element generates at least one notched subcarrier. FIG. 2 depicts a graph 200 of frequency (X-axis) versus power spectral density (PSD) (Y-axis). The graph 200 depicts three groups of consecutive notched subcarriers (referred to as subcarrier groups 202, 204, and 208). In this disclosure, a group of one or more consecutive subcarriers is referred to as a "subcarrier group." As will be further described below, in response to determining to notch a subcarrier group, all of the subcarriers that constitute the subcarrier group may be notched. FIG. 2 also depicts a portion of the PLC device 100 including four filter elements 252, 254, 256, and 258 of the adaptive filter bank 102, according to one embodiment. In FIG. 2, the filter elements 252, 254, 256, and 258 are configured to notch the subcarrier groups 202, 204, 206, and 208 respectively. Each of the filter elements 252, 254, 256, and 258 is associated with a corresponding switch 260, 262, 264, and 266. Each of the filter elements 252, 254, 256, and 258 is coupled with the filter adaptation unit 110. Although not depicted in FIG. 2, in some embodiments, each of the switches 260, 262, 264, and 266 can be coupled with the filter adaptation unit 110. The switches 260, 262, 264, and 266 can each connect their respective filter element in the processing path (e.g., activate the filter element) based, for example, on a control signal from the filter adaptation unit 110. In the example shown in FIG. 2, the filter adaptation unit 110 (e.g., the performance analysis unit 124) may determine that the subcarrier groups 202, 204, and 208 should be notched and that the subcarrier group 206 should not be notched. Accordingly, the switches 260, 262, and 266 can connect their corresponding filter elements 252, 254, and 258 in the processing path; while the switch 264 can disconnect the filter element 256 from the processing path. As depicted in FIG. 2, the filter elements 252, 254, and 258 can generate their respective notched subcarrier groups 202, 204, and 208; while the filter element 256 may not notch the subcarrier group 206 (because it is not connected in the processing path). In other words, connecting the filter element 252 in the processing path can cause all the subcarriers that are part of the subcarrier group 202 to be notched. As will be further discussed below, during operation of the PLC device 100, if the filter adaptation unit 110 (e.g., the performance analysis unit 124) determines that the performance measurements of the subcarrier group 206 are not in accordance with corresponding performance measurement thresholds, the filter adaptation unit 110 can dynamically determine to notch the subcarrier group 206 and can activate the corresponding filter element 256.

The graph 200 of FIG. 2 also depicts a plurality of subcarriers that are not notched and that can be used for transmission of the PLC signal. Typically, there can be multiple subcarriers or subcarrier groups (that are not notched) between two notched subcarrier groups. For clarity, subcarrier groups that are not notched are identified by dashed separating lines. The subcarrier groups that are not notched are identified in FIG. 2 as the subcarrier groups 211, 212, 216, 217, 218, 220, 221, 206, 222, 223, 224, and 225. As discussed above, each of the subcarrier groups can comprise any suitable number of subcarriers. In some embodiments, all of the subcarrier groups can have the same number of constituent subcarriers. However, in other embodiments, each of the subcarrier groups can comprise different number of constituent subcarriers. Referring back to FIG. 2, the subcarrier groups 212 and 216 are adjacent (or contiguous) to the notched subcarrier group 202. Accordingly, the subcarrier groups 212 and 216 are herein referred to as "adjacent subcarriers" of the notched subcarrier group 202. Likewise, the pair of subcarrier groups 218 and 220 and the pair of subcarrier groups 220 and 222 are each adjacent subcarriers for the notched subcarrier groups 204 and 208 respectively. It is noted that although FIG. 2 depicts each notched subcarrier group (e.g., the notched subcarrier group 204) being associated with a single adjacent subcarrier group 218 and 220 at each edge, embodiments are not so limited. The adjacent subcarriers can be identified as those subcarriers that are part of the guard band associated with the notched subcarrier group. Thus, in some embodiments, the guard band associated with the notched subcarrier group 204 may encroach upon a portion of the adjacent subcarrier groups 218 and 220 (e.g., one or more constituent subcarriers that belong to the subcarrier groups 218 and 220). In other embodiments, the guard band associated with the notched subcarrier group 204 may completely encroach upon the subcarrier groups 218 and 220 and may also encroach on one or more constituent subcarriers at the edge of the subcarrier groups 217 and 221). In this embodiment, the notched subcarrier group may be associated with more than two adjacent subcarriers at each edge. It is also noted that subcarriers that are part of a notch or guard band may not be used for transmission of the PLC signal. On the other hand, subcarriers that are not part of a notch or the guard band (for the notch) may be used to transmit the PLC signal. For example, in FIG. 2, the subcarrier groups 216, 217, and 218 fall between notched subcarrier groups 202 and 204. In FIG. 2, the subcarrier groups 216, 217, and 218 are not notched. However, the subcarrier group 216 is adjacent to the notched subcarrier group 202 and the subcarrier group 218 is adjacent to the notched subcarrier group 204. If the subcarrier groups 216 and 218 are part of the guard band, the subcarrier groups 216 and 218 may not be used for transmitting the PLC signal; while the subcarrier group 217 may be used for transmitting the PLC signal.

Referring back to FIG. 1, the filter adaptation unit 110 can operate in conjunction with the communication medium sensing unit 112 to determine whether one or more dynamic notches should be generated. The filter adaptation unit 110 can activate one or more filter elements that are responsible for generating the appropriate one or more dynamic notches. The communication medium sensing unit 112 can sense the PLC medium periodically or continuously to determine current information about the PLC medium. For example, the communication medium sensing unit 112 can determine whether other communication applications and systems are being used, which subcarriers are being used, to which subcarriers the dynamic notching should be applied, the power spectral density level to which the notched subcarrier (or notched subcarrier group) should be reduced ("notch depths"), etc. Based on the current state of the PLC medium (received from the communication medium sensing unit 112), the filter adaptation unit 110 (e.g., the performance analysis unit 124) can determine whether one or more dynamic notches should be generated. In other words, the filter adaptation unit 110 can determine to dynamically notch one or more subcarriers (or subcarrier groups) if the performance of an interfered system (e.g., a system with which the PLC device 100 interferes) is estimated not to be in accordance with corresponding performance thresholds of the interfered system. For example, filter adaptation unit 110 can determine to dynamically notch one or more subcarriers (or subcarrier groups) of the PLC device 100 if the PLC transmit power (of the PLC device 100) detected in a communication band of the interfered system is greater than a transmit power threshold. The filter adaptation unit 110 (e.g., the adaptive filter band controller 128) can provide one or more control signals to activate one or more filter elements that are responsible for generating the appropriate one or more dynamic notches at different time instants, at different frequency bands, and at different notching depths, as needed. With reference to the example of FIG. 2, the filter adaptation unit 110 (e.g., the performance analysis unit 124) may determine that another communication device is transmitting communications on one or more subcarriers that constitute the subcarrier group 206 of the PLC band. To avoid interference with the other communication device, the filter adaptation unit 110 (e.g., the performance analysis unit 124) may determine to dynamically notch the subcarrier group 206. The filter adaptation unit 110 may determine that the filter element 256 is designed to notch the subcarrier group 206. The filter adaptation unit 110 (e.g., the adaptive filter band controller 128) can then provide a control signal to enable/activate the filter element 256 and to apply appropriate filter coefficients to the filter element 256. The filter element 256 can notch the subcarrier group 206 to a suitable notch depth. The filter adaptation unit 110 can operate in conjunction with the communication medium sensing unit 112 to determine whether/how to update the filter coefficients of the filter elements, as will be further described below.

The filter adaptation unit 110 can then update the filter coefficients of one or more filter elements based, at least in part, on performance measurements of adjacent subcarriers (or adjacent subcarrier groups) that correspond to the one or more filter elements. The communication medium sensing unit 112 can sense the PLC medium and determine performance measurements of the adjacent subcarriers. The performance measurements can comprise SNR measurements, signal strength measurements, noise level measurements, interference level measurements, attenuation measurements, SNR distribution, etc. In some embodiments, modulation and coding schemes (MCS) used in the adjacent subcarriers may also be taken into consideration. The communication medium sensing unit 112 can estimate the performance measurements of the adjacent subcarriers (or adjacent subcarrier groups) continuously, at periodic intervals, or in accordance with any suitable (predetermined or dynamically determined) sensing schedule. The filter adaptation unit 110 (e.g., the performance analysis unit 124) can receive the performance measurements associated with the adjacent subcarriers that are adjacent/contiguous to the notched subcarrier group generated by each of the filter elements. With reference to the example of FIG. 2, the filter element 254 is designed to notch the subcarrier group 204. The filter adaptation unit 110 (e.g., the performance analysis unit 124) can receive performance measurements associated with the subcarrier groups 218 and 220 that are adjacent to the notched subcarrier group 204. Based on the performance measurements of the adjacent subcarrier groups 218 and 220, the filter adaptation unit 110 (e.g., the coefficient determination unit 126) can determine whether the notching characteristics (e.g., notching depth, notching width, etc.) of the notched subcarrier group 204 should be varied. The notching characteristics of the notched subcarrier group 204 can be controlled by the filter coefficients of the filter element 254. Accordingly, based on the performance measurements of the adjacent subcarrier groups 218 and 220, the filter adaptation unit 110 (e.g., the coefficient determination unit 126) can determine whether the filter coefficients of the filter element 254 should be varied. In some embodiments, the filter adaptation unit 110 (e.g., the coefficient determination unit 126) can also analyze the overall performance at the PLC device 100 (e.g., the SNR of the overall PLC band) to determine whether to vary the coefficients of the filter elements. The filter adaptation unit 110 (e.g., the coefficient determination unit 126) can modify the filter coefficients of the filter element 254 if the actual operating conditions in the corresponding adjacent subcarrier groups 218 and 220 and/or if the overall performance (e.g., the overall SNR) of the PLC device 100 in the PLC band deviates from the desired operating conditions. The overall performance of the PLC device 100 can be influenced by the inter-symbol interference (ISI). The ISI, in turn, may be determined by the filter order of each of the filter elements that generate the notched subcarrier groups and the guard interval of each of the notched subcarrier groups. In one embodiment, the filter adaptation unit 110 (e.g., the coefficient determination unit 126) can translate, in real-time, the performance measurement (e.g., the SNR) of the adjacent subcarriers and the overall performance in the PLC band into a new set of filter coefficients for the filter element 254 and can accordingly adapt the filter coefficients of the filter element 254. For example, various adaptation algorithms such as minimum mean square error (MMSE) filtering algorithms (e.g., using Wiener filters, Kalman filters, etc.) or a suitable heuristic adaptation algorithm can be used to translate the SNR of the adjacent subcarrier groups and/or the overall SNR in the PLC band to appropriate filter coefficients of the filter elements. In another embodiment, the filter adaptation unit 110 (e.g., the coefficient determination unit 126) can access a look-up table associated with the filter element 254 and can identify pre-computed filter coefficients that correspond to the current performance measurements of the adjacent subcarriers 218 and 220 and/or the overall performance of the PLC device 100 in the PLC band. By updating the filter coefficients according to the latest performance measurements of the adjacent subcarriers and the overall performance in the PLC band, the PLC signal can be appropriately filtered in accordance with the current environment and current PLC medium conditions. It is noted that in some embodiments, the performance (e.g., SNR) of the adjacent subcarriers may be influenced by other communication devices operating on the notched subcarrier groups (e.g., by out-of-band emissions in the adjacent subcarriers). In this embodiment, if it is determined that the SNR of the adjacent subcarriers is less than an SNR threshold, the filter adaptation unit 110 can determine to adapt the filter coefficients of the corresponding filter element to increase the guard bands of the notched subcarrier group (generated by the filter element).

It is noted that the filter adaptation unit 110 (e.g., the performance analysis unit 124) may operate in conjunction with the communication medium sensing unit 112 to continuously monitor the other subcarriers of the PLC band (e.g., in addition to the adjacent subcarriers) and to determine whether to dynamically notch additional sub carriers (or subcarrier groups). Furthermore, the filter adaptation unit 110 (e.g., the performance analysis unit 124) can also determine whether to stop notching one or more of the dynamically notched subcarrier groups. For example, if the SNR measurements of the adjacent subcarriers 218 and 220 exceed a predetermined threshold (e.g., different from an SNR threshold used to determine whether to notch the subcarrier group 204), the filter adaptation unit 110 may determine that there are no interfering communications in the subcarrier group 204. Accordingly, the filter adaptation unit 110 can determine to stop notching the subcarrier group 204 and may permit the PLC device 100 to use the subcarrier group 204 for PLC signal transmission. Thus, the filter bank 102 can be adapted to generate any suitable number of notched subcarriers (or groups of contiguous subcarriers), at any suitable subcarrier frequency (e.g., within the PLC band), at any suitable notching depth, and at any suitable time instant.

Figure 3:
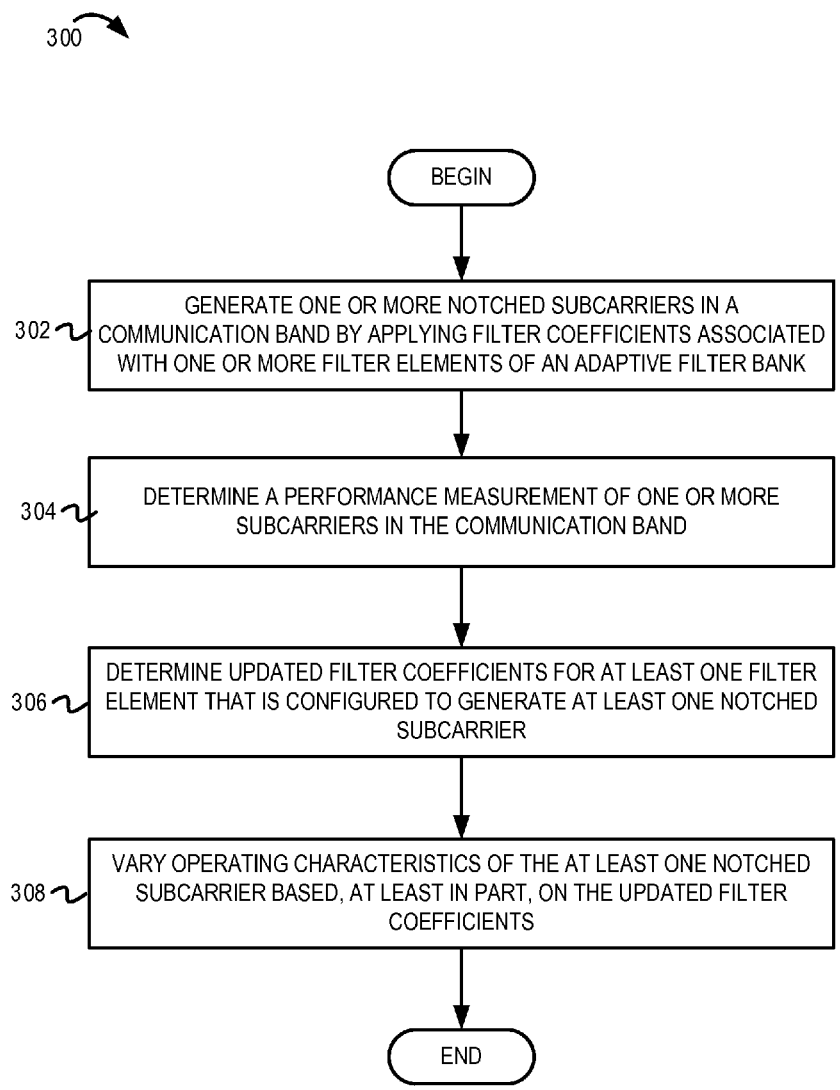
FIG. 3 is a flow diagram illustrating example operations of one embodiment for dynamically notching subcarriers.

FIG. 3 is a flow diagram ("flow") 300 illustrating example operations for dynamic subcarrier notching in a PLC medium. The flow 300 begins at block 302.

At block 302, one or more notched subcarriers are generated by applying filter coefficients associated with one or more filter elements of a filter bank. As discussed above, the filter bank can comprise a plurality of filter elements and each of the filter elements can be configured to generate at least one notched subcarrier or a notched subcarrier group (e.g., one or more contiguous subcarriers) in the communication band. As will be further described below in blocks 408 and 410 of FIG. 4, the filter adaptation unit 110 (e.g., the adaptive filter band controller 128) can activate one or more filter elements to generate corresponding one or more notched subcarrier groups in the PLC band. The flow continues at block 304.

At block 304, a performance measurement of one or more subcarriers in the communication band is determined. In some embodiments, the performance measurement of one or more adjacent subcarriers that are adjacent to each notched subcarrier can be determined. As discussed above, the adjacent subcarriers can be those subcarriers (or subcarrier groups) that are contiguous to the notched subcarrier groups generated by the one or more filter elements. Additionally, in some embodiments, the overall performance of the PLC device across all the subcarriers in the PLC band can be determined. In some embodiments, the performance measurement of each of the notched subcarriers (or subcarrier groups) can also be determined. For example, the communication medium sensing unit 112 can determine the SNR of PLC subcarriers that are not notched in the PLC communication band and can also determine a signal power in the notched subcarriers (either originating from another communication system or the PLC device 100). In some embodiments, the performance measurement can include the signal strength, signal-to-noise (SNR), attenuation level, noise level, and/or other suitable performance measurements. As will be further discussed below, the performance measurements of the adjacent subcarriers and/or the overall performance in the PLC band can be used (e.g., by the performance analysis unit 124) to determine whether to vary characteristics (e.g., notching depth, length, etc.) of the one or more notched subcarrier groups. The flow continues at block 306.

At block 306, updated filter coefficients associated with at least one filter element that is used to generate at least one notched subcarrier (or at least one notched subcarrier group) is determined. As described above, the coefficient determination unit 126 can determine the updated filter coefficients based, at least in part, on the performance measurement of the one or more adjacent subcarriers and/or the overall performance of the PLC device 100 in the PLC band. The flow continues at block 308.

At block 308, operating characteristics of the at least one notched subcarrier (or at least one notched subcarrier group) are varied based, at least in part, on the updated filter coefficients associated with the corresponding filter element. For example, the adaptive filter band controller 128 can apply the updated filter coefficients to the filter element. This, in turn, can modify the operating characteristics of the notched subcarrier (or notched subcarrier group) generated by the filter element. From block 308, the flow ends.

Figure 4:
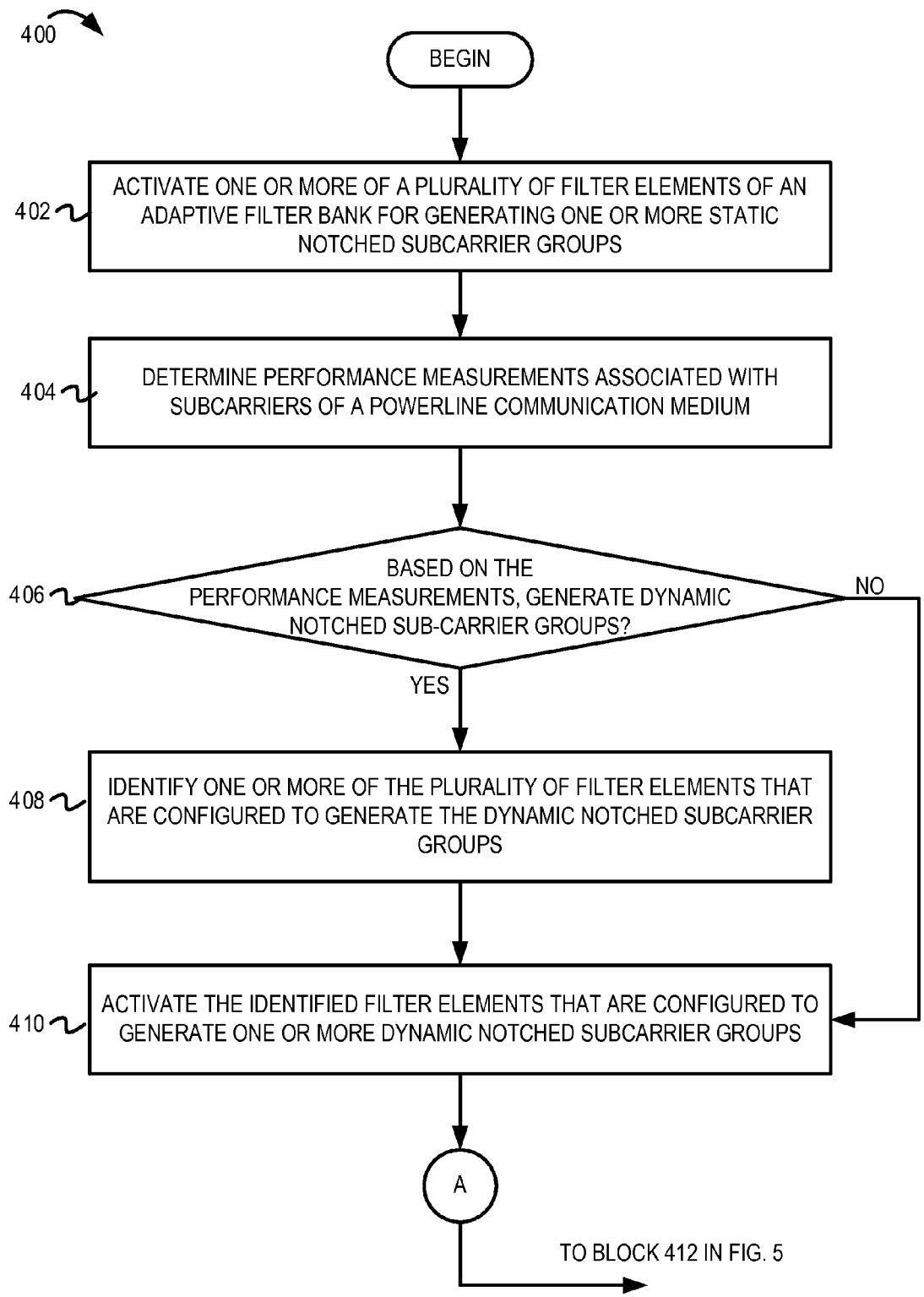
FIG. 4 is a flow diagram illustrating example operations of another embodiment for dynamically notching subcarriers.
Figure 5:
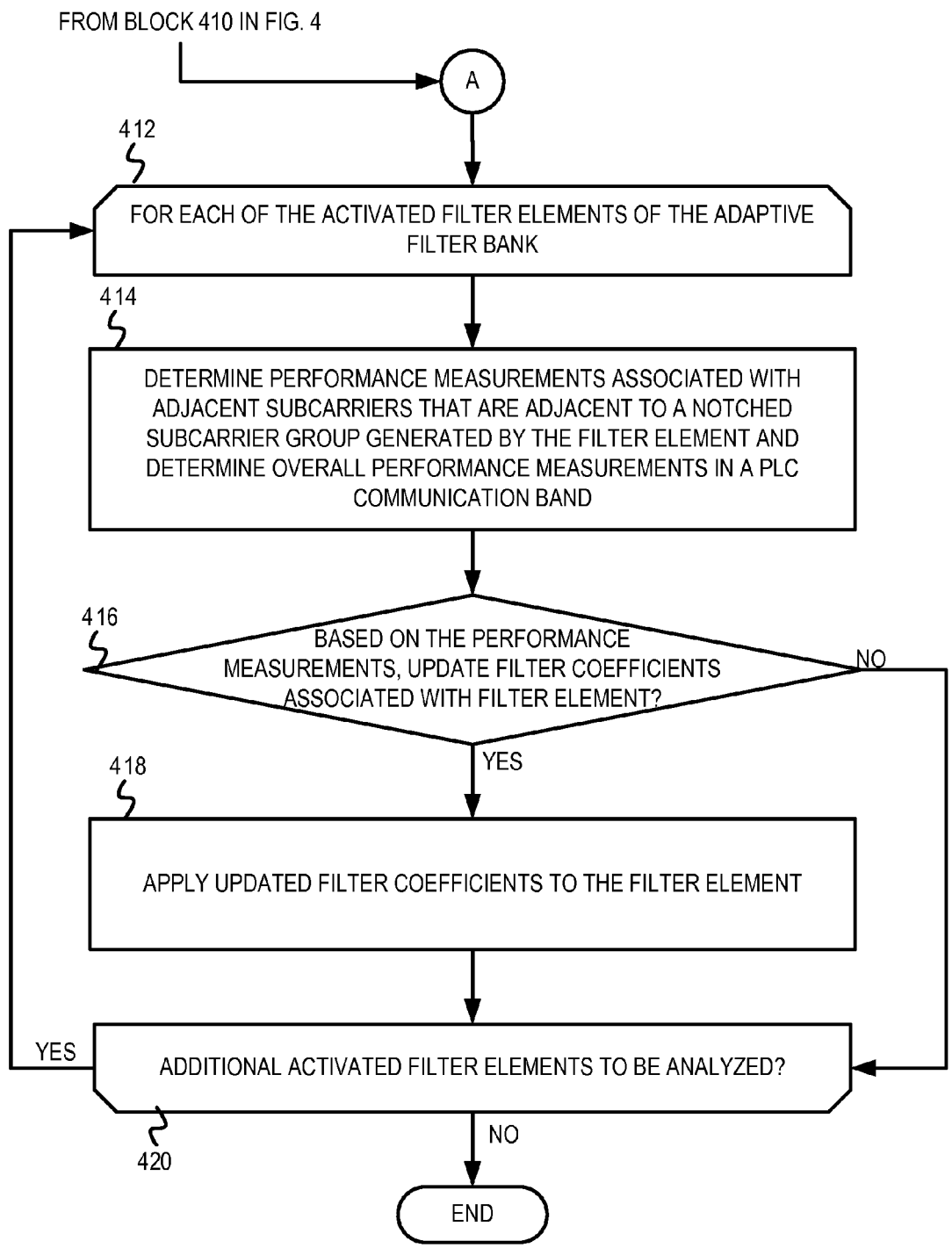
FIG. 5 is a continuation of FIG. 4 and also illustrates example operations of a PLC device for dynamically notching subcarriers.

FIG. 4 and FIG. 5 depict a flow diagram ("flow") 400 illustrating example operations of a PLC device for dynamically notching subcarriers. The flow 400 begins at block 402 in FIG. 4.

At block 402, one or more of a plurality of filter elements of an adaptive filter bank are activated for generating one or more static notched subcarrier groups. With reference to the example of FIGS. 1 and 2, the filter adaptation unit 110 (e.g., the performance analysis unit 124) can determine which of the filter elements 252, 254, 256, and/or 258 in the adaptive filter bank 102 are configured to generate the static notched subcarrier groups (predetermined based on PLC standards/specifications). As discussed above, each subcarrier group can comprise a cluster of one or more contiguous sub carriers. In one embodiment, the filter adaptation unit 110 (e.g., the adaptive filter band controller 128) can transmit a control signal (e.g., to the switch 260) to enable/activate the corresponding filter element 252 configured to generate the static notched subcarrier group 202. The filter adaptation unit 110 (e.g., the adaptive filter band controller 128) can also transmit a control signal to apply appropriate filter coefficients to cause the activated filter elements to notch their respective subcarrier groups to a suitable notch depth and notch width. In some embodiments, the filter coefficients initially applied to the filter elements can be predetermined based on a best performance of the corresponding PLC subcarrier groups. In some embodiments, the initial filter coefficients can be determined based on historical performance measurements of the corresponding PLC subcarrier groups. In other embodiments, the initial filter coefficients can be determined based on simulations or the performance measurements of the PLC subcarrier groups at startup (or during a channel estimation process). As will be further discussed below, the initial filter coefficients applied to the filter elements can be updated in accordance with changes in the current performance of subcarrier groups that are adjacent to the static notched subcarrier groups. The flow continues at block 404.

At block 404, performance measurements associated with subcarriers of a powerline communication medium are determined. As discussed above with reference to FIG. 1, the communication medium sensing unit 112 can determine performance measurements (e.g., SNR, signal strength, attenuation/noise level, etc.) associated with subcarriers in the PLC band at block 402. Based on these performance measurements, the filter adaptation unit 110 (e.g., the performance analysis unit 124) can determine whether other communication applications are currently being used, which subcarriers are being used by the other communication applications, etc. It is noted that in some embodiments, the filter adaptation unit 110 (e.g., the performance analysis unit 124) may also receive one or more notifications about the operation of other communication systems from a local sensing unit, or one or more notifications from other communication applications indicating an operating frequency band. For example, the local sensing unit may indicate whether the PLC transmit power (of the PLC device 100) detected in a communication band of the other communication system is greater than a threshold power. Based on these notifications, the filter adaptation unit 110 can identify one or more subcarrier groups in the PLC band that will interfere/overlap with the other communication applications and can determine to dynamically notch those overlapping subcarrier groups during PLC signal transmission. The flow continues at block 406.

At block 406, it is determined whether to generate dynamic notched subcarrier groups based, at least in part, on the performance measurements determined at block 404. In some embodiments, the performance measurements associated with the subcarriers (that were not statically notched) can be monitored and corresponding filter elements can be dynamically activated if the performance of other communication systems will be negatively impacted (e.g., if the PLC device 100 interferes with the other communication systems) at those subcarriers. For example, the filter adaptation unit 110 can determine to dynamically notch the subcarrier group 206 (i.e., to generate the dynamic notched subcarrier group 206) if the PLC transmit power (of the PLC device 100) detected in a communication band of another communication system is greater than a transmit power threshold determined by operating requirements of the other communication system. It is noted that other suitable performance measurements of the other communication system can be compared against corresponding performance measurement thresholds to determine whether the PLC device 100 will interfere with the communication system in one or more subcarriers. In one example, the filter adaptation unit 110 (e.g., the performance analysis unit 124) may determine to dynamically notch a subcarrier group (e.g., the subcarrier group 206) if it is determined that another communication application (e.g., RFID applications) will communicate on one or more constituent subcarriers of the subcarrier group 206 and that the PLC signal could potentially interfere with the RFID applications. The performance measurement thresholds can be selected to achieve a good compromise between guard band width and resulting ISI. The performance measurement thresholds can also take into consideration the maximum allowed transmit power of the PLC device 100 and a baseline (minimum) guard interval width. If it is determined to generate one or more dynamic notched subcarrier groups, the flow continues at block 408. Otherwise, the flow continues at block 412.

At block 408, one or more of the plurality of filter elements that are configured to generate the dynamic notched subcarrier groups are identified. As discussed above, the adaptive filter bank 102 can comprise a plurality of filter elements each of which are designed to notch at least one subcarrier group in the PLC band. Each of the filter elements can be an N-order infinite impulse response (IIR) filter, an N-order finite impulse response (FIR) filter, or another suitable filter of any suitable filter order. If the filter adaptation unit 110 determines (at block 406) to notch the subcarrier group 206, the filter adaptation unit 110 can determine to enable/activate the corresponding filter element 256 to notch the subcarrier group 206. This prevents the PLC device 100 from transmitting the PLC signal on the subcarrier group 206, thus minimizing the probability of interference between the PLC device 100 and the other communication applications. The flow continues at block 410.

At block 410, the identified filter elements that are configured to generate the dynamic notched subcarrier groups are activated. Referring to the example of FIG. 2, if it determined to dynamically notch the subcarrier group 206, the filter adaptation unit 110 (e.g., the adaptive filter band controller 128) can transmit a control signal to the switch 264 to connect the filter element 256 (designed to notch the subcarrier group 206) into the processing path. As another example, if it determined to dynamically notch the subcarrier group 206, the filter adaptation unit 110 can transmit a control signal to the filter element 256 to activate/enable the filter element 256. The filter adaptation unit 110 (e.g., the adaptive filter band controller 128) may also provide initial filter coefficients that should be applied to the filter element 256. As similarly discussed above with reference to block 402, in some embodiments, the filter coefficients initially applied to the filter element (that generates the dynamic notched subcarrier group 206) can be predetermined based on a best performance of the corresponding adjacent subcarriers (or subcarrier groups). In some embodiments, the initial filter coefficients can be determined based on historical performance measurements, simulations, and/or performance measurements (at startup) of the corresponding adjacent PLC subcarriers. As will be further discussed below, the filter coefficients applied to the filter elements can be updated in accordance with changes in the current performance of the subcarriers adjacent to the dynamic notched subcarrier groups and/or changes in the overall performance of the PLC device 100 in the PLC band. The flow continues at block 412 in FIG. 5.

At block 412, a loop begins for each of the activated filter elements of the adaptive filter bank. For example, the filter adaptation unit 110 (in conjunction with the communication medium sensing unit 112) can execute the operations described below in blocks 414-420 to determine and update filter coefficients associated with the filter elements based, at least in part, on performance measurements of subcarriers that are adjacent to the notched subcarrier groups and/or the overall performance of the PLC device 100 in the PLC band. The flow continues at block 414.

At block 414, performance measurements associated with adjacent subcarriers that are adjacent to a notched subcarrier group generated by the filter element and overall performance measurements in the PLC band are determined. In some embodiments, the communication medium sensing unit 112 can determine the performance measurements (e.g., SNR, signal strength, attenuation/noise/interference level, and/or other suitable performance measurements) associated with the adjacent subcarriers or subcarrier groups (e.g., the subcarriers 218 and 220) that are adjacent to the notched subcarrier group (e.g., the notched subcarrier group 204) generated by the filter element under consideration (e.g., the filter element 254). The communication medium sensing unit 112 can also determine the overall performance (e.g., SNR, signal strength, attenuation/noise/interference level, and/or other suitable performance measurements) of the PLC device 100 in the PLC band. Additionally, in some embodiments, the performance measurement of each of the notched subcarriers (or subcarrier groups) can also be determined. For example, the communication medium sensing unit 112 can determine the SNR of PLC subcarriers that are not notched in the PLC communication band and the signal power in the notched subcarriers (either originating from another communication system or the PLC device 100). The flow continues at block 416.

At block 416, it is determined whether to update filter coefficients associated with filter element based, at least in part, on the performance measurements associated with the adjacent subcarriers and the overall performance in the PLC band. For example, the filter adaptation unit 110 (e.g., the performance analysis unit 124) can analyze the performance measurements associated with the adjacent subcarriers 218 and 220 (that are adjacent to the notched subcarrier group 204 generated by the filter element 254). It is noted that in some embodiments, the filter adaptation unit 110 (e.g., the performance analysis unit 124 and/or the coefficient determination unit 126) can analyze the performance measurements associated with adjacent subcarrier groups 218 and 220 (groups of one or more contiguous subcarriers) that are adjacent to the notched subcarrier group 204. In one example, the filter adaptation unit 110 can compare the SNR associated with the adjacent subcarriers (or subcarrier groups) 218 and 220 against entries in a lookup table. The lookup table can be implemented as part of the filter adaptation unit 110, in the PLC device 100, or in a data structure separate from the PLC device 100 and the filter adaptation unit 110. The lookup table can comprise a set of one or more SNR ranges for the adjacent subcarriers (or subcarrier groups) 218 and 220 associated with a notched subcarrier group 204. Each SNR range can be associated with a corresponding set of filter coefficients for the filter element 254 that generated the notched subcarrier group 204. For example, if the SNR of the adjacent subcarriers 218 and 220 falls within a first SNR range (e.g., 5 dB to 5.5 dB), the corresponding first set of filter coefficients can be selected (e.g., by the coefficient determination unit 126). For a given notched subcarrier group 204, the SNR range can be mapped to a set of filter coefficients to optimize the guard interval in the adjacent subcarriers 218 and 220 against filter capacity, performance, and efficiency in the vicinity of the notched subcarrier group 204 (e.g., in the adjacent subcarriers 218 and 220). Additionally, the overall performance (e.g., the overall SNR) of the PLC device 100 in the PLC band can also be taken in consideration when determining whether to update the filter coefficients. For example, the overall SNR of the PLC device 100 can be compared against a set of one or more SNR ranges for the PLC device 100. Thus, for a given notched subcarrier group 204, the set of filter coefficients of the corresponding filter element 254 can be selected (e.g., by the coefficient determination unit 126) based on the SNR of the adjacent subcarriers 218 and 220 and based on the overall SNR in the PLC band. More specifically, the filter coefficients can be selected to minimize the number of subcarriers in subcarrier groups 218 and 220 that are utilized as the guard band for the notched subcarrier group 204, thus increasing the portion of adjacent subcarrier groups that can be used to transmit the PLC signal (i.e., increasing the communication capacity of the adjacent subcarrier groups). The filter coefficients can also be selected to reduce the number of adjacent subcarriers that are utilized as guard bands for the notched subcarrier group 204. For example, the filter coefficients can be selected to ensure that only one constituent subcarrier from the subcarrier groups 218 and 220 is utilized as a guard band at each edge of the notched subcarrier group 204.

In some embodiments, each filter element may be associated with a lookup table that comprises a mapping between an SNR range of the adjacent subcarriers (or subcarrier groups) and corresponding filter coefficients of the filter element. Each filter element may also be associated with a lookup table that comprises a mapping between an overall SNR range for the PLC device 100 and corresponding filter coefficients of the filter element. In other embodiments, each filter element may be associated with multiple lookup tables depending on the depth and width of the notched subcarrier groups. For example, filter coefficients for an SNR range of 5 dB to 5.5 dB for a first notch depth may be different from the filter coefficients for the same SNR range and a second notch depth. In some embodiments, the performance requirements of all the notched subcarrier groups can be independent of each other. For example, the PLC transmit power and spectral density requirements of the notched subcarrier group 202 can be different from the PLC transmit power and spectral density requirements of the notched subcarrier group 204. Consequently, the corresponding filter coefficients for each of the filter elements can be independent of each other. For example, the filter coefficients of the filter element 252 may be independent of the filter coefficients of the filter element 254. In other embodiments, the performance requirements of all the notched subcarrier groups can be considered the same. In other words, all the notched subcarrier groups 202, 204, 206, and 208 can have the same PLC transmit power and spectral density requirements. In this embodiment, the filter elements 252, 254, 256, and 258 can be associated with a common lookup table that maps an SNR range (within which the SNR of the adjacent subcarriers and/or the overall SNR in the PLC band lies) to corresponding filter coefficients for the filter element. In some embodiments, the lookup table may have a fine granularity. In other words, the lookup table can comprise a large number of narrow SNR ranges and corresponding sets of filter coefficients. In other embodiments, however, the lookup table can have a coarse granularity. That is, the lookup table can comprise a smaller number of wide SNR ranges and corresponding sets of filter coefficients. It is noted that in some embodiments, the filter adaptation unit 110 (e.g., the coefficient determination unit 126) can dynamically map the SNR (or other suitable performance measurements) of the adjacent subcarriers and/or the overall SNR in the PLC band into corresponding filter coefficients. For example, the filter adaptation unit 110 can maintain a control loop for each filter element to continuously receive performance measurements in corresponding adjacent subcarriers, to continuously receive overall performance measurements of the PLC device 100 in the PLC band, and to convert the received performance measurements into filter coefficients. As another example, the PLC device 100 can comprise a control loop that executes on each of the filter elements 252, 254, 256, and 258 (or each component of the filter element) in the adaptive filter bank 102. The control loop can convert the received performance measurements into corresponding filter coefficients.

In some embodiments, the filter adaptation unit 110 (e.g., the adaptive filter band controller 128) can determine not to update the filter coefficients (e.g., not to transmit a control signal indicating the new filter coefficients to the filter elements) if the new set of filter coefficients is the same as the current set of filter coefficients. In other embodiments, the filter adaptation unit 110 can determine not to update the filter coefficients if the new set of filter coefficients is within a predetermined threshold (e.g., within 1%) of the current set of filter coefficients. If it is determined to update filter coefficients associated with the filter element, the flow continues at block 418. Otherwise, if it is determined not to update the filter coefficients associated with filter element, the flow continues at block 420.

At block 418, the updated filter coefficients are applied to the filter element. The flow moves from block 416 to block 418 if the filter adaptation unit 110 determines to update the filter coefficients associated with the filter element. For example, the filter adaptation unit 110 (e.g., the adaptive filter band controller 128) can transmit a control signal to one or more components of the filter element (e.g., the filter element 254) indicating the updated filter coefficients. By updating the filter coefficients of the filter element 254, this can ensure that the corresponding subcarrier group 204 is notched optimally without reducing the throughput and performance of the adjacent subcarrier groups 216 and 218 and the PLC device 100. The flow continues at block 420.

At block 420, it is determined whether additional activated filter elements are to be analyzed. If the filter adaptation unit 110 (e.g., the performance analysis unit 124) determines to analyze another filter element, the flow loops back to block 412 where a next filter element is identified and the operations described above with reference to blocks 414-418 are executed for the next filter element. Otherwise, the flow ends.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. In some embodiments, as discussed above, IIR filtering techniques can be employed to generate the static notches and the dynamic notches. In other embodiments, FIR filtering techniques can be employed generate the static notches and the dynamic notches. In other embodiments, other suitable filtering techniques and filter designs can be used to notch appropriate subcarrier groups of the PLC band. In one example, a bandstop filter can be used to notch each of the subcarrier groups. Individual bandstop filters can be connected in series to notch all the requisite subcarrier groups in the frequency domain. In another example, elliptic IIR filters can be used to generate deep notches (at the appropriate subcarrier group) with a small guard band width at the notch edges. It is noted, however, that other suitable number and type of filters can be connected in any suitable configuration to notch all the requisite subcarrier groups in the PLC band. For example, one filter may be designed to notch more than one subcarrier group, two or more filters may be designed to notch one subcarrier group, etc.

In some embodiments, the filter adaptation unit 110 (e.g., the performance analysis unit 124 and/or the coefficient determination unit 126) can take the performance of the PLC device 100 (as a whole) into consideration when determining how/whether to vary the filter coefficients of the filter elements. For example, the filter coefficients of the filter elements can be adapted to the conditions and performance of the PLC device 100 by trading-off an increase in ISI against the use of wider and a greater number of guard bands against an increase in capacity in these frequency regions (i.e., the adjacent subcarriers).

In some embodiments, the filter adaptation unit 110 (e.g., the performance analysis unit 124 and/or the coefficient determination unit 126) can determine whether to perform aggressive filtering at the notched subcarrier group based on the applications of the PLC device 100, the other communication applications sharing the same subcarriers (or subcarrier groups) as the PLC device 100, the desired quality of service of the PLC device 100, the desired quality of service of the other communication applications, and other suitable considerations. An aggressive filtering approach can indicate that the notched subcarrier group has a small number of guard bands with a small guard band width. However, this also indicates that there is a sharp cutoff (e.g., a steep slope) at the edges of the notched subcarrier group. This sharp cutoff can result in a longer filter length (e.g., a higher filter order and a higher number of components in the filter element). In one example of this embodiment, the filter adaptation unit 110 may determine to aggressively filter and notch the PLC subcarrier group 204 if the PLC device 100 does not have stringent performance requirements, the interfering communication application (e.g., an RFID application) has stringent performance requirements, and/or if a higher transmission capacity in the adjacent subcarriers (or subcarrier groups) 218 and 220 is preferred over a higher overall SNR at the PLC device 100. In this example, the filter adaptation unit 110 may compare the SNR (or other performance measurements) of the adjacent subcarriers 218 and 220 against more lax SNR thresholds. The filter adaptation unit 110 can use an aggressive filtering approach if the adjacent subcarriers 218 and 220 have poor performance and to achieve higher throughput on the adjacent subcarriers 218 and 220. Furthermore, the filter adaptation unit 110 may afford a higher priority to notching the PLC subcarrier group 204 at the appropriate notch depth over increasing the overall SNR of the PLC device 100 in the PLC band. As another example, the filter adaptation unit 110 may determine not to aggressively filter and notch the PLC subcarrier group 208 if the PLC device 100 has stringent performance requirements and/or if a higher overall SNR at the PLC device 100 is preferred over a higher transmission capacity in the adjacent subcarriers 222 and 224. In some embodiments, the filter adaptation unit 110 can separately analyze each notched subcarrier group (e.g., the performance and requirements of the corresponding adjacent subcarriers) to determine whether to aggressively filter the notched subcarrier group. For example, the filter adaptation unit 110 can determine to aggressively filter the notched subcarrier group 204, to not aggressively filter the notched subcarrier group 206, and so on. In other embodiments, the filter adaptation unit 110 can analyze the PLC band as a whole and can determine whether to aggressively filter all the notched subcarrier groups 202, 204, 206, and 208.

In some embodiments, whether to aggressively filter and notch the PLC subcarrier group 208 can also influence the number of adjacent subcarriers that are utilized as part of the guard band for the notched subcarrier group 208. As discussed above, the aggressive filtering approach can indicate that the notched subcarrier group has guard bands with a small guard band width. In one example, if the notched subcarrier group 208 is generated by aggressive filtering, only one subcarrier at each edge of the notched subcarrier group 208 may be utilized as a guard band for the notched subcarrier group 208. An example of this embodiment is depicted in the adjacent subcarriers 222 and 224 of FIG. 2. In this embodiment, the other subcarriers 223 and 225 contiguous to the subcarriers 222 and 224 may be used for transmitting the PLC signal thus increasing the transmission capacity of the PLC device 100. However, if it is determined not to aggressively filter and notch the PLC subcarrier group 208, more than one subcarrier may be utilized as a guard band at each edge of the notched subcarrier group 208. Thus, in addition to the subcarriers 222 and 224, the subcarriers 223 and 225 (contiguous to the subcarriers 222 and 224) may be utilized as the guard band. The PLC device 100 may be prevented from transmitting in the subcarriers that are part of the guard band. Accordingly, the number of subcarriers in which the PLC device 100 is permitted to transmit decreases, thus reducing the transmission capacity of the PLC device 100.

In some embodiments, in determining whether to aggressively filter the notched subcarrier groups and in calculating the filter coefficients from the performance measurements, the filter adaptation unit 110 (e.g., the performance analysis unit 124) may also take into consideration whether the PLC device 100 is transmitting PLC signals at a maximum transmit power level. For example, if the PLC device 100 is not transmitting at the maximum transmit power level in the vicinity of the notched subcarrier groups (e.g., in the adjacent subcarriers or adjacent subcarrier groups), the filter adaptation unit 110 can determine whether the SNR/performance in the adjacent subcarriers (and/or the overall performance of the PLC device 100) can be increased simply by increasing the transmit power level (i.e., without changing the filter coefficients of the filter element that generates the notched subcarrier group). Furthermore, because the SNR of the PLC device 100 is indirectly linked (e.g., via tome-domain ISI) to the guard band width, the potential change in SNR (and MCS) and guard band width for each notched subcarrier group can be evaluated to determine whether to reduce the width of the guard bands in the frequency domain or whether to reduce the guard interval/ISI in the time domain.

Finally, it is noted that although embodiments describe operations for dynamic notching of subcarriers in a multi-carrier system, embodiments are not so limited. In other embodiments, single-carrier systems (e.g., wideband code division multiple access (CDMA) systems) can be configured to execute similar operations (described above in FIGS. 1-5) to minimize interference with other communication devices and applications (e.g., radio frequency identification (RFID) applications) operating in an overlapping portion of the communication band. In other words, the single-carrier system can be configured to apply narrow notching filters to one or more sections of the communication band to minimize interference between the single-carrier system and other systems operating in the same communication band. However, in this example, because the communication band comprises a single carrier, it is not possible to completely notching or switch off certain subcarriers in the communication band. In some embodiments, the inability to switch-off subcarriers in the communication band can result in a reduction in the overall performance (e.g., SNR) of the single-carrier system. However, in some embodiments, the reduction in overall performance can be compensated by power control, adaptive channel coding, and/or other suitable techniques.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
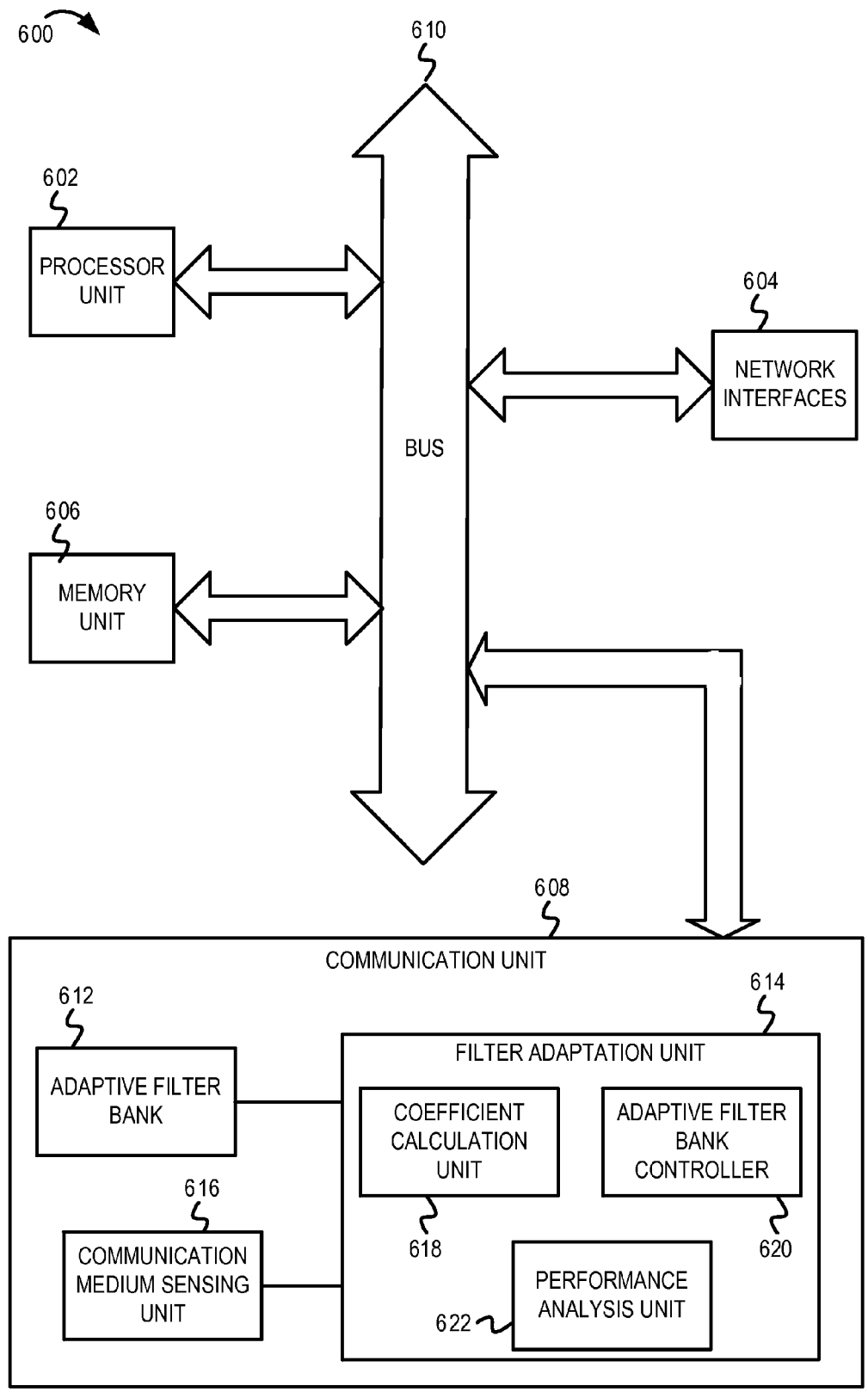
FIG. 6 is a block diagram of one embodiment of an electronic device including an adaptive filter bank mechanism.

FIG. 6 is a block diagram of one embodiment of an electronic device 600 including an adaptive filter bank for dynamic powerline notching. In some embodiments, the electronic device 600 can be a laptop computer, a tablet computer, a netbook, a mobile phone, a smart appliance, a gaming console, a desktop computer, a powerline communication device, a network bridge device, or other suitable electronic device comprising powerline communication capabilities. For example, the electronic device 600 can be a PLC-compatible network device that implements functionality to communicate over a powerline network. The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The electronic device 600 also includes a bus 610 (e.g., PCI, ISA, PCI-Express, HyperTransport®, InfiniBand®, NuBus, AHB, AXI, etc.), and network interfaces 604 that include at least one of a wireless network interface (e.g., a WLAN interface, a BLUETOOTH® (Bluetooth) interface, a WiMAX interface, a ZigBee® interface, a Wireless USB interface, etc.) and/or a wired network interface (e.g., a powerline communication interface, an Ethernet interface, etc.). For example, the electronic device 600 can be a PLC-compatible network device and the network interface 604 can be a PLC interface for communicating over a powerline network.

The electronic device 600 also includes a communication unit 608. The communication unit 608 comprises an adaptive filter bank 612, a filter adaptation unit 614, and a communication medium sensing unit 616. The filter adaptation unit 614 comprises a performance analysis unit 622, a coefficient calculation unit 618, and an adaptive filter band controller 620. As discussed above with reference to FIGS. 1-4, the communication medium sensing unit 616 can determine performance measurements associated with subcarriers in the PLC band. Based on these performance measurements, the performance analysis unit 622 can determine whether transmissions of the electronic device 600 will interfere with (and affect the performance of) another communication device operating on overlapping communication bands. The filter adaptation unit 614 (e.g., the performance analysis unit 622) can identify one or more subcarrier groups on which transmissions of the electronic device 600 will interfere with other communication devices and can determine to dynamically notch the identified one or more subcarrier groups. Accordingly, the filter adaptation unit 614 (e.g., the adaptive filter band controller 620) can enable/activate appropriate filter elements of the adaptive filter bank 612 that are configured to notch the one or more identified subcarrier groups. Furthermore, based on performance measurements of adjacent subcarriers (that are adjacent to the notched subcarrier groups) and the overall performance of the electronic device 600 in the PLC band, the filter adaptation unit 614 (e.g., the coefficient calculation unit 618) can also vary the filter coefficients of the enabled filter elements to optimize the width of the guard bands (in the adjacent subcarriers) against the performance of the adjacent subcarriers and the overall performance of the electronic device 600.

Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). For example, the communication unit 608 may comprise one or more additional processors that are distinct from the processor unit 602 coupled with the bus 610. The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, an adaptive filter bank for dynamic notching in a powerline communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a communication device, the method comprising:
    enabling a filter element of a plurality of filter elements in a filter bank, wherein the filter element reduces power for a notched subcarrier in a communication band and one or more guard bands associated with the notched subcarrier, wherein one or more adjacent subcarriers, adjacent to the notched subcarrier, are part of the one or more guard bands;
    determining a first performance measurement of the notched subcarrier and a second performance measurement of the one or more adjacent subcarriers associated with the notched subcarrier;
    determining filter coefficients associated with the filter element based, at least in part, on the first performance measurement and the second performance measurement; and
    updating the filter element based, at least in part, on the filter coefficients.

2. The method of claim 1, further comprising:
    determining a third performance measurement of a plurality of subcarriers that constitute the communication band,
    wherein the filter coefficients are determined based, at least in part, on the third performance measurement.

3. The method of claim 1, wherein,
    said determining the filter coefficients comprises:
        determining the filter coefficients to minimize the one or more guard bands and to maximize communication in the one or more adjacent subcarriers.

4. The method of claim 1, further comprising:
    determining to notch the notched subcarrier of the communication band based, at least in part, on sensing interference in a frequency associated with the notched subcarrier; and
    selecting the filter element from the plurality of filter elements in response to determining to notch the notched subcarrier, wherein each of the plurality of filter elements is configured to notch at least one subcarrier in the communication band.

5. The method of claim 1, comprising:
    determining that the first performance measurement is not in accordance with a first performance measurement threshold; and dynamically determining to notch the notched subcarrier in response to determining that the first performance measurement not in accordance with the first performance measurement threshold.

6. The method of claim 1, wherein said enabling the filter element comprises:
transmitting a control signal to a switching device that enables the filter element in response to the control signal.

7. The method of claim 1, wherein
determining the filter coefficients is further based, at least in part, on an overall performance measurement of the communication device in the communication band.

8. The method of claim 1, further comprising, after enabling the filter element:
determining that the second performance measurement is in accordance with a second performance measurement threshold; and
dynamically determining to stop notching the notched subcarrier in response to determining that the second performance measurement is in accordance with the second performance measurement threshold.

9. The method of claim 1, further comprising:
comparing the first performance measurement to a performance measurement threshold; and
determining updated filter coefficients associated with the filter element if the first performance measurement is not in accordance with the performance measurement threshold.

10. The method of claim 1, wherein the filter coefficients are determined based, at least in part, on characteristics of the notched subcarrier, the characteristics comprising at least one member of a group consisting of a frequency location of the notched subcarrier, a notch width of the notched subcarrier, and a power spectral density to which the notched subcarrier should be reduced.

11. The method of claim 1, wherein determining the filter coefficients comprises:
calculating the filter coefficients using the first performance measurement in an algorithm executed in response to determining the first performance measurement.

12. The method of claim 1, wherein determining the filter coefficients comprises:
accessing a lookup table associated with the filter element to identify the filter coefficients that correspond to the first performance measurement.

13. The method of claim 12, wherein the lookup table comprises a mapping between one or more performance measurement ranges and corresponding one or more filter coefficients of the filter element.

14. The method of claim 13, wherein determining the filter coefficients comprises:
determining that the first performance measurement is within a first performance measurement range in the lookup table; and
selecting a first set of filter coefficients corresponding to the first performance measurement range.

15. The method of claim 1, further comprising:
determining that the determined filter coefficients are not within a predetermined percentage of current filter coefficients of the filter element; and
updating the filter element to use the determined filter coefficients in response to determining that the determined filter coefficients are not within the predetermined percentage of current filter coefficients.

16. The method of claim 1, further comprising:
determining whether to vary a transmit power of the communication device based, at least in part, on the first performance measurement and a maximum transmit power of the communication device.

17. The method of claim 1, wherein the notched subcarrier is a predetermined first carrier of the of a plurality of subcarriers.

18. The method of claim 17, wherein enabling the filter element of the plurality of filter elements comprises independently enabling the filter element without enabling a another one of the plurality of filter elements.

19. The method of claim 1, comprising:
determining that the first performance measurement is not in accordance with a performance measurement threshold;
determining whether the first performance measurement can be made in accordance with the performance measurement threshold by varying a transmit power level of the communication device;
if determined that the first performance measurement can be made in accordance with the performance measurement threshold by varying the transmit power level of the communication device,
varying the transmit power level of the communication device for the notched subcarrier; and
determining not to update the filter coefficients associated with the filter element; and
if determined that the first performance measurement cannot be made in accordance with the performance measurement threshold by varying the transmit power level of the communication device,
said determining the filter coefficients associated with the filter element.

20. The method of claim 1, wherein the communication device is a powerline communication device, and wherein the communication band is a powerline communication frequency band.

21. The method of claim 1, wherein the first performance measurement comprises at least one member of a group consisting of a signal-to-noise ratio (SNR) measurement, a signal strength measurement, a noise level measurement, an interference level measurement, an attenuation measurement, and an SNR distribution measurement.

22. The method of claim 1, wherein the filter coefficients are determined based on at least one criteria from a group consisting of maximizing communication in the one or more adjacent subcarriers associated with the notched subcarrier, maximizing a performance of the communication device in the communication band, minimizing a width of the one or more guard bands associated with the notched subcarrier, and minimizing a number of guard bands associated with the notched subcarrier.

23. The method of claim 1,
wherein the notched subcarrier is a dynamic notched subcarrier in response to the first performance measurement being below a performance measurement threshold.

24. A communication device for operating in a network, the communication device comprising:
a processor;
a filter bank comprising a plurality of filter elements; and
memory having instructions stored therein which when executed by the processor cause the communication device to:
enable a filter element of the plurality of filter elements in the filter bank, wherein the filter element reduces power for a notched subcarrier in a communication band and one or more guard bands associated with the notched subcarrier, wherein one or more adjacent subcarriers, adjacent to the notched subcarrier, are part of the one or more guard bands;

determine a first performance measurement of the notched subcarrier and a second performance measurement of the one or more adjacent subcarriers associated with the notched subcarrier;

determine filter coefficients associated with the filter element based, at least in part, on the first performance measurement and the second performance measurement; and updating the filter element based, at least in part, on the filter coefficients.

25. The communication device of claim 24, wherein the instructions, when executed by the processor, further cause the communication device to:

determine a third performance measurement of a plurality of subcarriers that constitute the communication band, wherein the filter coefficients associated with the filter element are determined based, at least in part, on the third performance measurement.

26. The communication device of claim 24, wherein the filter coefficients are determined to minimize the one or more guard bands and to maximize communication in the one or more adjacent subcarriers.

27. The communication device of claim 24, wherein the instructions, when executed by the processor, further cause the communication device to:

determine to notch the notched subcarrier of the communication band based, at least in part, on sensing interference in a frequency associated with the notched subcarrier; and select the filter element from the plurality of filter elements in response to a determination to notch the notched subcarrier.

28. The communication device of claim 24, wherein the filter coefficients are further based, at least in part, on an overall performance measurement of the communication device in the communication band.

29. The communication device of claim 24, wherein the instructions, when executed by the processor, further cause the communication device to perform an operation from a group consisting of:

calculating the filter coefficients using the first performance measurement in an algorithm executed in response to determining the first performance measurement; and accessing a lookup table associated with the filter element to identify the filter coefficients that correspond to the first performance measurement.

30. The communication device of claim 29, wherein the lookup table comprises a mapping between one or more performance measurement ranges and corresponding one or more filter coefficients of the filter element, and wherein the instructions, when executed by the processor, further cause the communication device to:

determine that the first performance measurement is within a first performance measurement range in the lookup table; and select a first set of filter coefficients corresponding to the first performance measurement range.

31. The communication device of claim 24, wherein the instructions, when executed by the processor, further cause the communication device to:

determine whether to vary a transmit power of the communication device based, at least in part, on the first performance measurement and a maximum transmit power of the communication device.

32. The communication device of claim 24, wherein the notched subcarrier is a predetermined first carrier of the of a plurality of subcarriers.

33. The communication device of claim 24, wherein the instructions, when executed by the processor, further cause the communication device to:

determine that the first performance measurement is not in accordance with a performance measurement threshold;

determine whether the first performance measurement can be made in accordance with the performance measurement threshold by varying a transmit power level of the communication device;

if determined that the first performance measurement can be made in accordance with the performance measurement threshold by varying the transmit power level of the communication device, vary the transmit power level of the communication device for the notched subcarrier; and determine not to update the filter coefficients associated with the filter element; and if determined that the first performance measurement cannot be made in accordance with the performance measurement threshold by varying the transmit power level of the communication device, determine the filter coefficients associated with the filter element.

34. A non-transitory machine-readable medium having instructions stored therein which when executed by a processor of a communication device cause the communication device to perform operations comprising:

enabling a filter element of a plurality of filter elements in a filter bank, wherein the filter element reduces power for a notched subcarrier in a communication band and one or more guard bands associated with the notched subcarrier, wherein one or more adjacent subcarriers, adjacent to the notched subcarrier, are part of the one or more guard bands;

determining a first performance measurement of the notched subcarrier and a second performance measurement of the one or more adjacent subcarriers associated with the notched subcarrier;

determining filter coefficients associated with the filter element based, at least in part, on the first performance measurement and the second performance measurement; and updating the filter element based, at least in part, on the filter coefficients.

35. The non-transitory machine-readable medium of claim 34, wherein the operations further comprise:

determining a third performance measurement of a plurality of subcarriers that constitute the communication band, wherein the filter coefficients are determined based, at least in part, on the third performance measurement.

36. The non-transitory machine-readable medium of claim 34, wherein said operation of determining the filter coefficients comprises:

determining the filter coefficients to minimize the one or more guard bands and to maximize communication in the one or more adjacent subcarriers.

37. The non-transitory machine-readable medium of claim 34, wherein the operations further comprise:

determining to notch the notched subcarrier of the communication band based, at least in part, on sensing interference in a frequency associated with the notched subcarrier; and selecting the filter element from the plurality of filter elements in response to determining to notch the notched subcarrier.

38. The non-transitory machine-readable medium of claim 37, wherein the operations further comprise:

determining the filter coefficients based, at least in part, on an overall performance measurement of the communication device in the communication band.

39. The non-transitory machine-readable medium of claim 34, wherein the operation of determining the filter coefficients comprises at least one of:

calculating the filter coefficients using the first performance measurement in an algorithm executed in response to determining the first performance measurement, and accessing a lookup table associated with the filter element to identify the filter coefficients that correspond to the first performance measurement.

40. The non-transitory machine-readable medium of claim 39, wherein the lookup table comprises a mapping between one or more performance measurement ranges and corresponding one or more filter coefficients, and wherein said operation of determining the filter coefficients comprises:

determining that the first performance measurement is within a first performance measurement range in the lookup table; and selecting a first set of filter coefficients corresponding to the first performance measurement range.

41. The non-transitory machine-readable medium of claim 34, wherein the operations comprise:

determining that the first performance measurement is not in accordance with a performance measurement threshold;

determining whether the first performance measurement can be made in accordance with the performance measurement threshold by varying a transmit power level of the communication device;

if determined that the first performance measurement can be made in accordance with the performance measurement threshold by varying the transmit power level of the communication device, varying the transmit power level of the communication device for the notched subcarrier; and determining not to update the filter coefficients associated with the filter element; and if determined that the first performance measurement cannot be made in accordance with the performance measurement threshold by varying the transmit power level of the communication device, said determining the filter coefficients associated with the filter element.

\* \* \* \* \*